(12) United States Patent
Nakamura et al.

(10) Patent No.: US 7,040,791 B2
(45) Date of Patent: May 9, 2006

(54) ILLUMINATION APPARATUS HAVING FRONT AND SIDE ILLUMINATION UNITS

(75) Inventors: Kentaro Nakamura, Sakai (JP); Isamu Yamanishi, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 10/661,833

(22) Filed: Sep. 12, 2003

(65) Prior Publication Data

US 2004/0114378 A1    Jun. 17, 2004

(30) Foreign Application Priority Data

Oct. 23, 2002   (JP) ............................. 2002-308700

(51) Int. Cl.
  *F21V 17/10* (2006.01)
(52) U.S. Cl. ...................... 362/544; 362/546; 362/365
(58) Field of Classification Search ............... 362/464, 362/507, 544, 240, 365, 459, 487, 506, 543, 362/227, 235–238, 251–253, 362, 364, 368, 362/241, 249, 546
See application file for complete search history.

(56) References Cited

U.S. PATENT DOCUMENTS

| | | | | |
|---|---|---|---|---|
| 3,405,898 A | * | 10/1968 | Ringle ......................... | 362/544 |
| 4,758,932 A | * | 7/1988 | Coons ......................... | 362/546 |
| 4,797,792 A | * | 1/1989 | Oen ............................ | 362/507 |
| 4,831,503 A | * | 5/1989 | DeSantis et al. ............ | 362/543 |
| 5,546,284 A | * | 8/1996 | Harada ........................ | 362/544 |
| 5,702,173 A | * | 12/1997 | Kawamura ................... | 362/544 |
| 5,718,303 A | | 2/1998 | Ogasawara et al. | |
| 6,095,672 A | * | 8/2000 | Beninga et al. ............. | 362/545 |
| 6,293,686 B1 | * | 9/2001 | Hayami et al. ............. | 362/465 |
| 6,343,869 B1 | * | 2/2002 | Kobayashi ................... | 362/464 |
| 6,450,673 B1 | * | 9/2002 | Toda et al. ................. | 362/464 |
| 6,481,876 B1 | * | 11/2002 | Hayami et al. ............. | 362/464 |
| 6,552,492 B1 | * | 4/2003 | Kover et al. ................ | 362/464 |
| 6,578,993 B1 | * | 6/2003 | Kobayashi et al. ......... | 362/464 |
| 2002/0044455 A1 | | 4/2002 | Ozawa et al. | |
| 2002/0097585 A1 | | 7/2002 | Mochiuzuki et al. | |
| 2003/0012033 A1 | | 1/2003 | Shikiya | |

FOREIGN PATENT DOCUMENTS

| | | |
|---|---|---|
| JP | 1-265401 A | 10/1989 |
| JP | 4-122238 A | 11/1992 |
| JP | 8-58468 A | 3/1996 |
| JP | 8-99539 A | 4/1996 |
| JP | 8-198139 A | 8/1996 |

* cited by examiner

*Primary Examiner*—Thomas M. Sember
*Assistant Examiner*—Ismael Negron
(74) *Attorney, Agent, or Firm*—The Webb Law Firm (57) ABSTRACT

An illuminating apparatus for a work vehicle includes a front illuminating unit, a side illuminating unit, a frame supporting the front illuminating unit and the side illuminating unit and a translucent lens unit covering the front illuminating unit and the side illuminating unit. The front illuminating unit and the side illuminating unit are supported to the frame. The translucent lens unit comprises a one-piece translucent lens directly connected and supported to the frame. The frame includes an attaching portion for attaching the frame to a front portion of the vehicle body.

19 Claims, 6 Drawing Sheets

ILLUMINATION APPARATUS HAVING FRONT AND SIDE ILLUMINATION UNITS

BACKGROUND OF THE INVENTION

1. Field of the Invention

The present invention relates to an illuminating apparatus for a work vehicle, and relates, more particularly, to an illuminating apparatus including a front illuminating unit, a side illuminating unit, a frame supporting the front illuminating unit and the side illuminating unit, and a translucent lens unit covering the front illuminating unit and the side illuminating unit.

2. Description of the Related Art

An illuminating apparatus of the above-noted type is known from e.g. the Japanese Utility Model Application "Kokai" No.: Hei. 4-122238 (see its FIG. 2 and paragraph [0006]). In this apparatus, a front illuminating unit, a side illuminating unit and a reflector for the front illuminating unit are supported to a mounting frame. And, a translucent lens unit is supported through engagement between a projection of this lens unit and an engaging projection of the reflector.

With the conventional illuminating apparatus noted above, in order to assure sufficient support strength for the translucent lens unit as well as sufficient strength of the entire illuminating apparatus, it is necessary to form the reflector rigid and strong. This tends to invite the disadvantage of cost increase and weight increase.

In view of the above, a primary object of the present invention is to provide an illuminating apparatus for a work vehicle, which unit allows simple and easy attaching operation thereof to the vehicle body and which also provides superior strength and which can be formed economically and light-weight.

SUMMARY OF THE INVENTION

For accomplishing the above object, according to the present invention, in an illuminating apparatus of the type described at the onset, the front illuminating unit and the side illuminating unit are supported to the frame; the translucent lens unit comprises a one-piece translucent lens directly connected and supported to the frame; and the frame includes an attaching portion for attaching the frame to a front portion of the vehicle body.

With the above construction, as the frame is attached to the vehicle frame via the attaching portion, the front illuminating unit, the side illuminating unit and the translucent lens unit comprising a one-piece translucent lens also can be attached together to the vehicle body.

Further, since the one-piece translucent lens is directly connected to the frame, even if the lens comprises a small and light-weight lens capable of providing only the reflecting function as the reflector for the front illuminating unit and the side illuminating unit, the translucent lens and the frame can be firmly and reliably connected to each other and the strength of the entire illuminating apparatus can be enhanced also.

Therefore, the attachment or connection of the entire illuminating apparatus to the vehicle body can be effectively reinforced. Moreover, the apparatus can be easily assembled and attached to the vehicle body only by attaching the frame to the vehicle body. Further, the support strength for the translucent lens and the strength of the entire illuminating apparatus are also increased to be more resistant against breakage thereof. In addition, by forming the reflector smaller and lighter, cost reduction and weight reduction of the apparatus can be achieved.

According to a further feature of the invention, said front illuminating unit comprises a pair of right and left front lamps and said side illuminating unit comprises a pair of right and left side lamps. With this construction, by attaching the frame supporting these components to the vehicle body, the right and left front lamps and side lamps and the frame can be assembled together at one time to the vehicle body. Therefore, with the attachment of the frame to the vehicle body, the right and left front lamps and side lamps can all be assembled to the vehicle body. Hence, the assembly and connection operation becomes simple and easy.

According to a still further feature of the invention, the frame includes a front frame portion for supporting the right and left front lamps and side frame portions extending from opposed ends of the front frame portion to the rear side of the vehicle body for supporting the side lamps. With this construction, the front lamps and the side lamps are disposed with displacement in the fore and aft direction of the vehicle body. Hence, it becomes possible to arrange the front lamps as close as possible to the outer sides of the vehicle body. And, with such arrangement, the frame has a U-shape in a plan view, thereby to assure some free space between the side frame portions rearwardly of the front frame portion. This free space can be effectively used for maintenance or checking of the inside of the engine hood and/or disposing engine-related devices rearwardly of the illuminating apparatus. That is, such advantageous free space can be obtained with attaching the illuminating apparatus as rearwardly as possible of the vehicle body.

Therefore, by arranging the front lamps as laterally outwardly as possible of the vehicle body, these front lamps can provide effective front illumination. Also, in case the free space is secured rearwardly of the illuminating apparatus also, by disposing the illuminating apparatus as rearwardly as possible of the vehicle body, the entire length of the vehicle body can be formed as short as possible.

According to one preferred embodiment of the present invention, said translucent lens includes a front lens portion covering the right and left front lamps and side lens portions covering the right and left side lamps, with the front lens portion and the side lens portions being formed together as one piece. In comparison with a construction in which the front lens portion and the side lens portions are provided as separate components, the above construction is more advantageous for being able to provide the translucent lens with even superior strength. And, this superior strength of the translucent lens provides further improvement in the strength of the entire illuminating apparatus. Therefore, the entire illuminating apparatus can be firmly assembled and attached with even greater strength against damage thereof.

Preferably, the frame defines a recess for accommodating the front lamps and the side lamps therein and an opening of this recess is closed by the translucent lens. With this construction, since the front lamps and the side lamps are covered with the frame and the translucent lens, it is possible to restrict adherence of raindrops or car washing water droplets to the lamps. Therefore, when the vehicle body is washed or traveled in rain, water will hardly adhere to the front lamps or side lamps, thereby to restrict occurrence of trouble thereof.

Incidentally, even if the work vehicle includes only the front lamps, in a road traveling under broad daylight, the lamp beam can be projected over a rather wide angle by refracting the beam from the front lamps through the translucent lens. However, such construction may cause trouble or inconvenience in the case of night work or traveling in a warehouse. That is, in such case, the side areas from the vicinity of the front wheels of the work vehicle cannot be illuminated. If a separately installed work lamp were provided to cope with this, this would result in additional cost. Moreover, such a work lamp is usually installed for illuminating the entire work vehicle. Besides, if the work vehicle includes only the front lamps, a destination sight during the vehicle turn becomes sometimes poor. Therefore, there will occur such trouble of having, to frequently change the inclination of the work lamp for illuminating the front wheel portion of the vehicle. In view of these, the work vehicle is often equipped with side lamps in addition to the front lamps.

Preferably, a pair of right and left pair of such side lamps are attached and supported laterally of the vehicle body. With this construction, the side illumination by the side lamps can be effected in an efficient manner. For instance, in case the frame includes side frame portions extending from opposed ends of the front frame portion for supporting the side lamps, the side lamps can be easily detachably attached in the inner and outer direction of the side frame portions.

Therefore, the side areas of the vehicle body will be illuminated efficiently for providing greater visibility. In particular, if the frame includes the side frame portions, attachment and replacement of the side lamps can be done easily.

Preferably, a side lamp reflector for reflecting beam from said each side lamp is formed symmetric in the right and left direction across the side lamp in a plan view. With this, the illumination angle for the side area of the vehicle body will obtain a greater value. Therefore, it is possible to minimize the area where the illumination from the front lamps is impossible or insufficient. Hence, the night work or work in a warehouse will be facilitated, More preferably, the side lamp reflector is formed vertically asymmetric across the side lamp in a side view with an upper portion of the reflector above the side lamp being wider than a lower portion thereof below the side lamp. With this construction, even if the side lamp is disposed at a low height, the illuminating range of the side lamp will be extended both in the lateral and upper direction, thereby to assure sufficient visible work area visible from the operator.

For controlling the illuminating apparatus for a work vehicle described above, in particular, controlling ON/OFF of each side lamp, the invention provides the following features.

According to one preferred embodiment of the invention, the side lamp on the inner side of steering is automatically turned ON in response to an ON instruction from a switching device for each side lamp and also to the steering of steering wheels by an angle exceeding a predetermined angle.

With this construction, if the ON instruction for the side lamp is issued in advance, when the vehicle makes a turn and then travels straight, in response to a steering operation of the steering wheels, the side lamps will be automatically turned OFF without the trouble of issuing OFF instruction for the side lamps. Conversely, when the vehicle travels straight and then makes a turn, in response to a steering operation of the steering wheels, the side lamps will be automatically turned ON without the trouble of issuing ON instruction for the side lamps.

Therefore, with issuance of ON instruction for the side lamps in advance, with the simple steering operation of the vehicle alone, the vehicle can travel straight with the side lamps OFF for eliminating unnecessary illumination or can make a turn with the side lamps ON for greater visibility of the side areas. Hence, the operator can concentrate on driving, without being bothered about ON/OFF of the illumination.

According to a further embodiment of the present invention, the side lamp is automatically turned ON in response to an ON instruction from the switching device for each front lamp and also to an ON instruction from the switching device for each side lamp.

With this construction, with issuance of ON instruction for the side lamps in advance, if the switching device for the front lamps is operated for turning ON the front lamps, the side lamps will be turned ON automatically, without the trouble of issuing ON instruction for the side lamps. Conversely, if the switching device for the front lamps is operated for turning OFF the front lamps, the side lamps will be turned OFF automatically, without the trouble of issuing OFF instruction for the side lamps.

Therefore, with issuance of ON instruction for the side lamps in advance, the vehicle can travel straight with the front and side lamps OFF for eliminating unnecessary illumination or can make a turn with the front and side lamps ON for greater visibility of the front and side areas.

According to a still fixer embodiment of the invention, said each side lamp is automatically turned ON, in response to an ON instruction form the switching device for the side lamp unit and also to a lowering movement of an implement connected to the rear of the vehicle body to a lowered work position.

With this construction, with issuance of ON instruction for the side lamps in advance, when the implement is lowered to the lowered work position during a work traveling, the side lamps will be automatically turned ON, without the trouble of issuing the ON instruction for the side lamps. Conversely, in a non-working traveling, when the implement is lifted up to an elevated non-work position, the side lamps will be automatically turned OFF without the trouble of issuing OFF instruction for the side lamps.

Therefore, with issuance of ON instruction for the side lamps in advance, the vehicle can effect a work with the side lamps ON for providing greater visibility or can travel straight with the side lamps OFF for eliminating unnecessary illumination, by the simple operation of lifting up the implement. Then, the operator can concentrate on the particular work using the implement. And, the operator does not have to be bothered about ON/OFF of the illumination at the time of the start or completion of that work.

According to a still further embodiment of the present invention, said each side lamp is automatically turned ON, in response to an ON instruction form the switching device for the side lamp unit and also to a change in the traveling speed of the vehicle to speed lower than a predetermined speed.

With this construction, with the issuance of the ON instruction for the side lamps in advance, if the vehicle is to travel while effecting a work, the side lamps will be automatically turned ON without the trouble of issuing the ON instruction for the side lamps, in response to a change-speed operation of traveling of the vehicle to a lower speed. Conversely, if the vehicle is to travel without effecting any work, in response to a change-speed operation of the vehicle travel to a higher speed, the side lamps will be automatically turned ON without the trouble of issuing OFF instruction for the side lamps.

Therefore, with issuance of ON instruction for the side lamps in advance, the vehicle can effect a work with the side lamps ON for providing greater visibility or can travel straight with the side lamps OFF for eliminating unnecessary illumination, by the simple change-speed operation and in accordance with the new speed.

Further and other features and advantages of the present invention will become apparent upon reading the following detailed disclosure of the invention with reference to the accompanying drawings.

DESCRIPTION OF THE PREFERRED EMBODIMENTS

A preferred embodiment of the invention will be described next using a tractor as an example of the work vehicle, with reference to the accompanying drawings.

Figure 1:
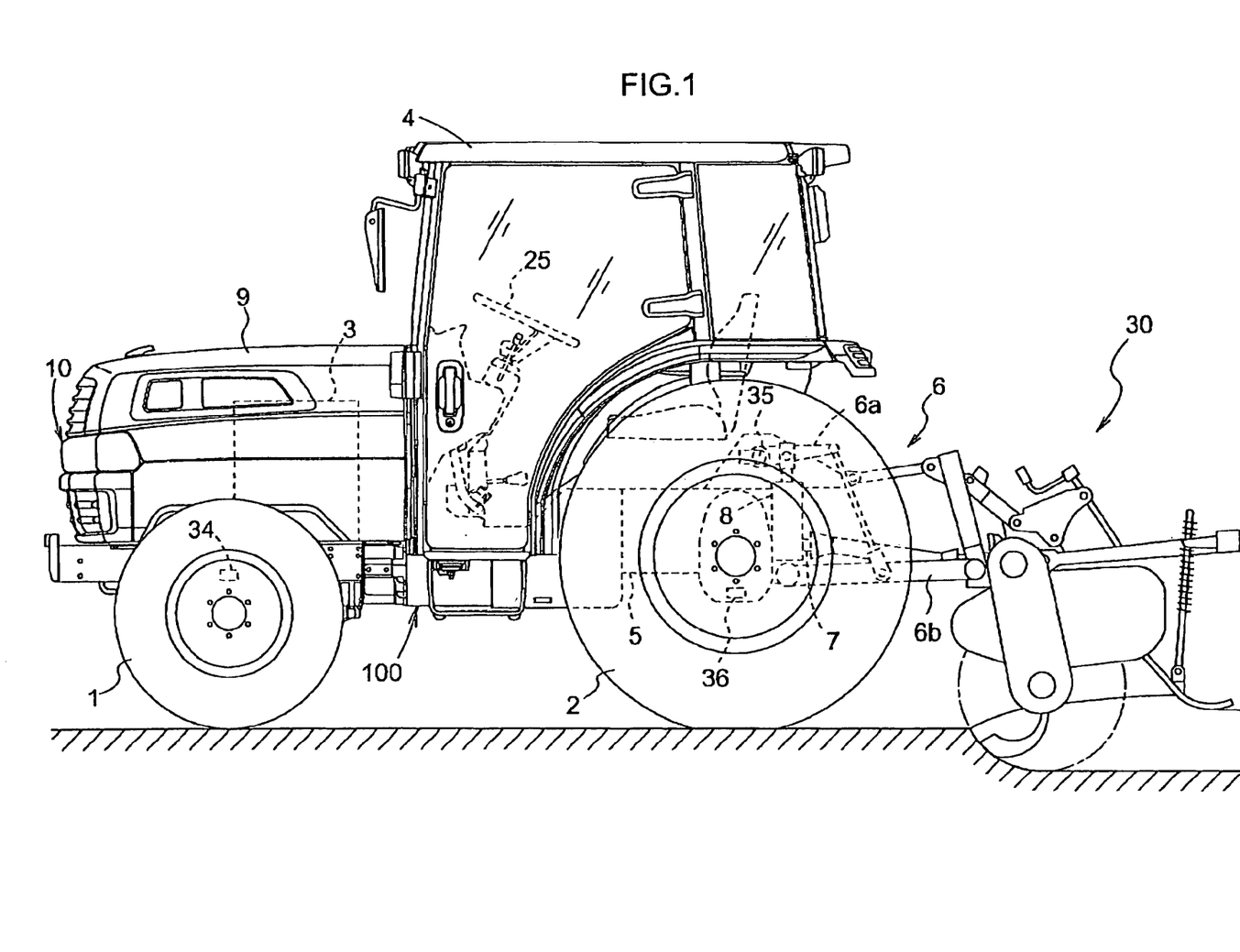
FIG. 1 is an overall side view of a tractor.

As shown in FIG. 1, this tractor includes a vehicle body 100 having a driver's cabin 4, a pair of right and left steerable and drivable front wheels 1, a pair of right and left drivable rear wheels 2, an engine section mounted on the front portion of the vehicle body 100 and having an engine 3, a transmission casing 5 disposed rearwardly of the engine section and forming a rear portion of the vehicle body 100, a link mechanism 6 disposed rearwardly of the transmission easing 6 and having a pair of right and left lift arms 6a and a pair of right and left lower links 6b, a PTO output shaft 7 provided also rearwardly of the transmission casing 5, etc. The link mechanism 6 is operable to lift up and down a rotary plow (an example of implement) 30 by vertically pivoting the right and left lift arms 6a by means of a lift cylinder 8.

This tractor is constructed as a passenger-driven plowing machine by transmitting power of the engine 3 via the PTO output shaft 7 to the rotary plow 30. Alternatively, with pivotable and drivable connection of any other kind of implement to the rear of the vehicle body, the tractor can be modified into various types of passenger-driven work vehicles.

Figure 2:
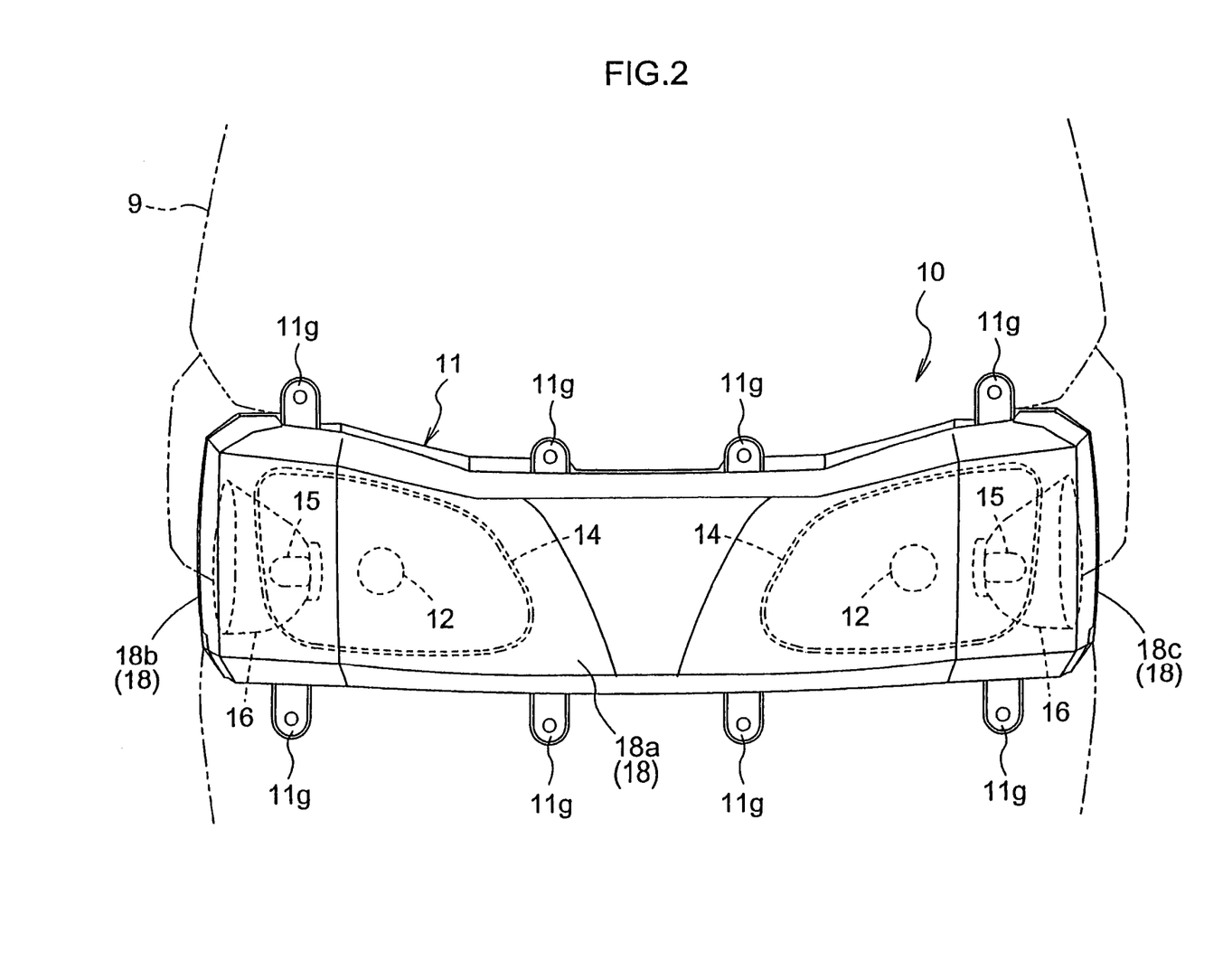
FIG. 2 is a front view of an illuminating apparatus.

At the front end of an engine hood 9, there is provided an illuminating apparatus 10 for the tractor. This illuminating apparatus, as shown in FIGS. 2, 4 for example, includes a single frame 11, a front illuminating unit consisting of a front illuminating assembly including a pair of right and left front lamps 12 and a pair of right and left lamp shades 13 and of a pair of right and left front lamp reflectors 14, a side illuminating unit consisting of a pair of right and left side lamps 15 and a pair of right and left side lamp reflectors 16, an ornamental plate 17 disposed between opposed front ends of the right and left front lamp reflectors 14, and a translucent lens 18 (corresponding to "translucent lens unit") constructed as a one-piece component made of resin for covering the respective lamps 12, 15 and the ornamental plate 17.

Figure 3:
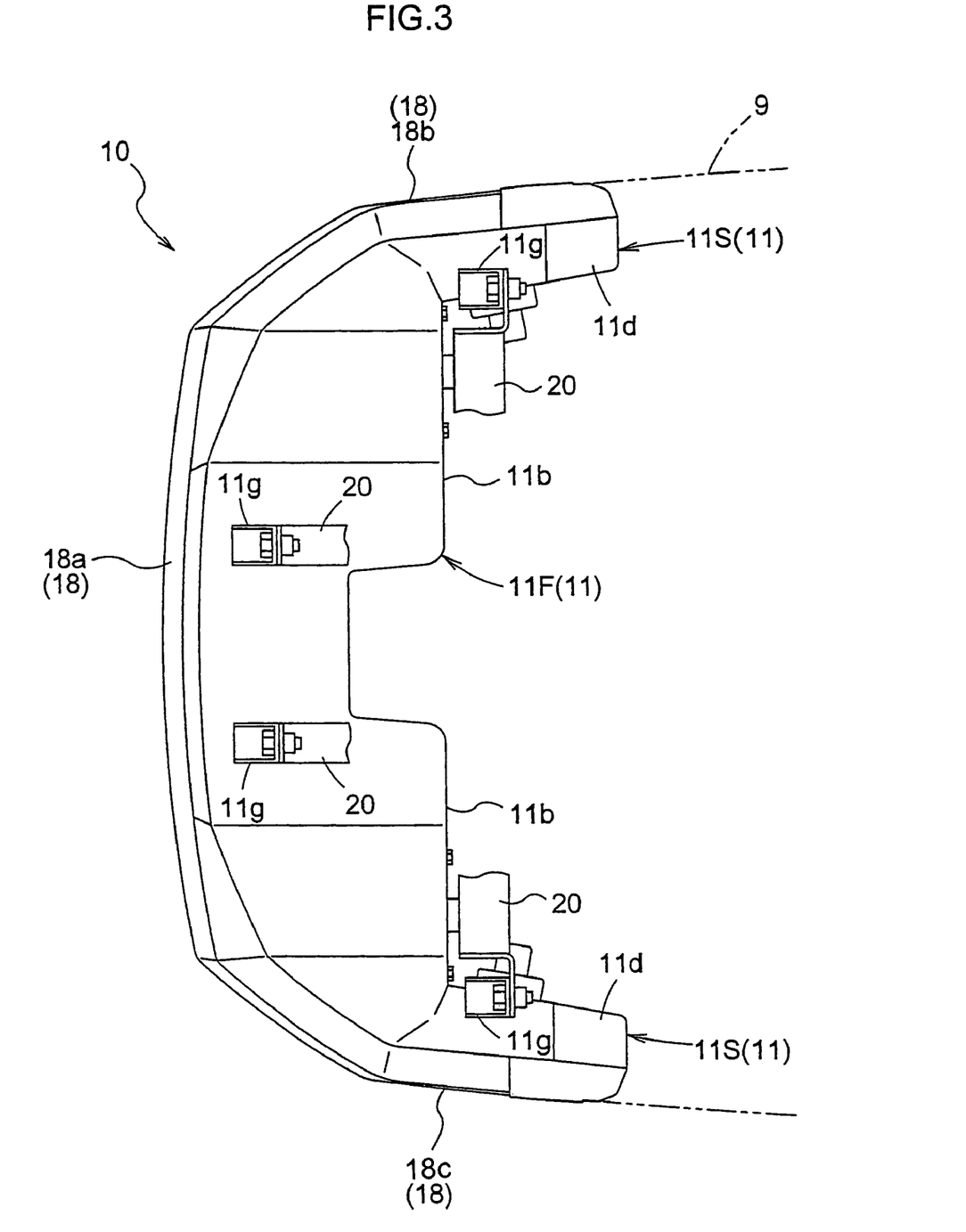
FIG. 3 is a plan view of the illuminating apparatus.

The frame 11 includes a front frame portion 11F and side frame portions 11S. The front frame portion 11F includes front lamp supporting portions 11b at opposed ends in the lateral direction of the vehicle body, the supporting portions 11b having front lamp attaching holes 11a. The side frame portions 11S extend from the opposed ends of the front frame portion 11F to the rear side of the vehicle body and have side lamp supporting portions 11d having side lamp attaching holes 11c. The frame 11 is made of a bent plate metal. Specifically, the frame 11 is bent to form one accommodating recess lie extending over the entire length thereof, with the fame 11 being open forwardly of the vehicle body in the area of the front frame portion 11F and being open laterally of the vehicle body in the areas of the right and left side frame portions 11S. As shown in FIGS. 2 and 3 for example, the frame 11 includes a plurality of attaching portions 11g provided at a plurality of positions on the outer faces of its top plate and its bottom plate, with the attaching portions being juxtaposed in the fore and aft direction and the lateral direction of the vehicle body. Each attaching portion 11g comprises e.g. a bracket to be connected and fastened by an attaching screw to a support member 20 (see FIG. 5) secured to the front of the vehicle body 100.

The right and left front illuminating assemblies (the right and left pairs of front lamps 12 and lamp shades 13) and the front lamp reflectors 14 are arranged to be accommodated within the accommodating recess 11e. Further, the front lamps 12 are supported to the front lamp supporting portions 11b of the front frame portion 11F with the lamps 12 being oriented forwardly of the vehicle body. The left side lamp 15 and the side lamp reflector 16 are arranged to be accommodated within the accommodating recess 11e, and the side lamp 15 is supported to the side lamp supporting portion 11d of the left side frame portion 11S with the lamp 15 being oriented laterally of the vehicle body. The right side lamp and the side lamp reflector 16 are arranged to be accommodated within the accommodating recess 11e, and the side lamp 15 is supported to the side lamp supporting portion 11d of the right side frame portion 11S with the lamp 15 being oriented laterally of the vehicle body.

Figure 4:
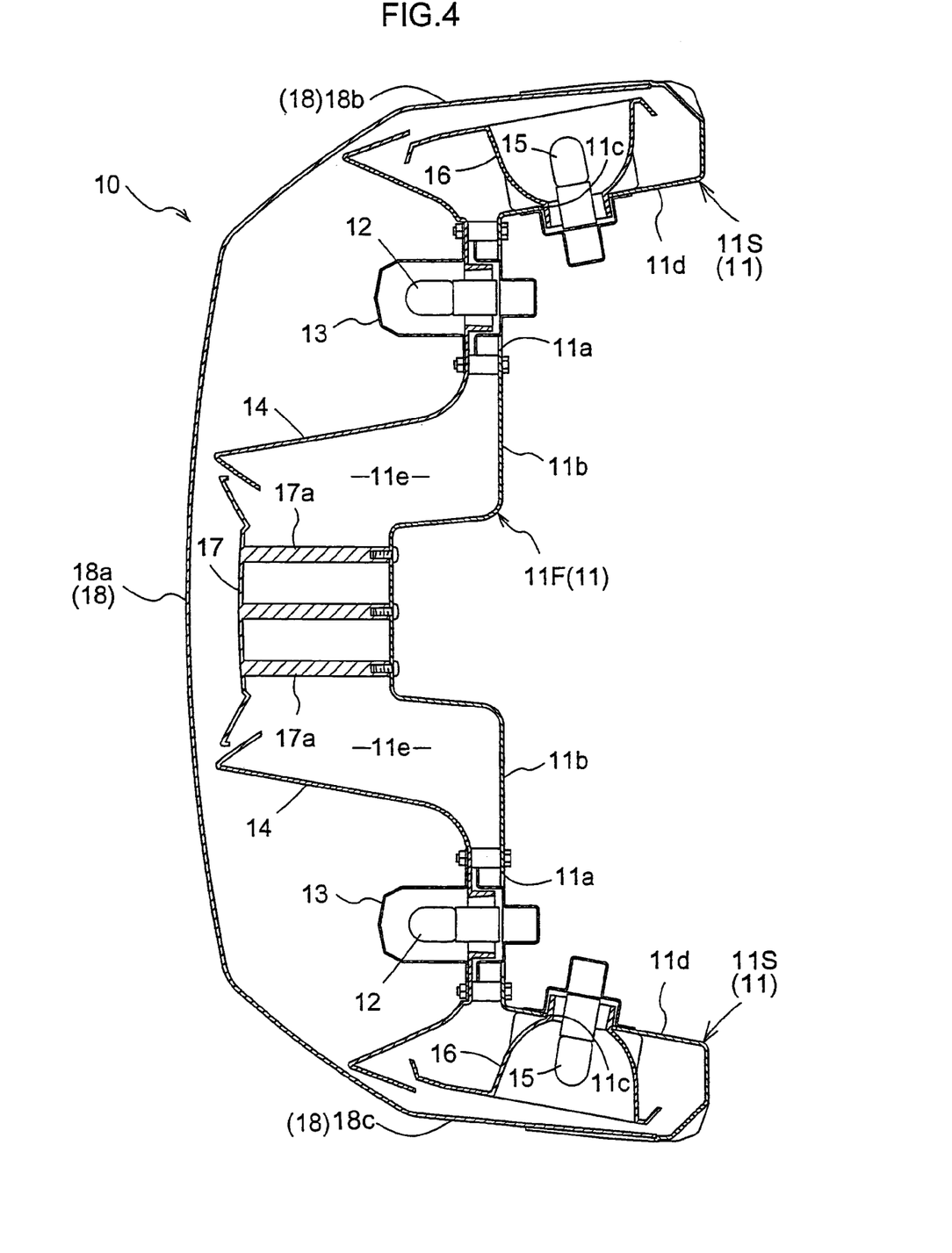
FIG. 4 is a plan view in horizontal section of the illuminating apparatus.

In its plan view, each side lamp reflector 16, as shown in FIG. 4, has a cup-like or U shape symmetric in the right and left direction across the side lamp 15. This shape serves to assure a maximum illumination angle laterally of the vehicle body and serves also to minimize the area where the illumination from the front lamps 12 is not possible or insufficient. Further, in its front view, each side lamp reflector 16, as shown in FIG. 2, is formed vertically asymmetric across the side lamp 15. More particularly, the portion of the reflector 16 upwardly of the side lamp has a greater width than the other portion thereof downwardly of the lamp 15. This serves to assure a maximum illumination range from the side lamp 15 laterally and upwardly of the vehicle body.

From a plurality of portions of the back face of the ornamental plate 17, attaching legs 17a extend rearwardly. These attaching legs 17a are connected between the adjacent front lamp supporting portions 11b.

Figure 5:
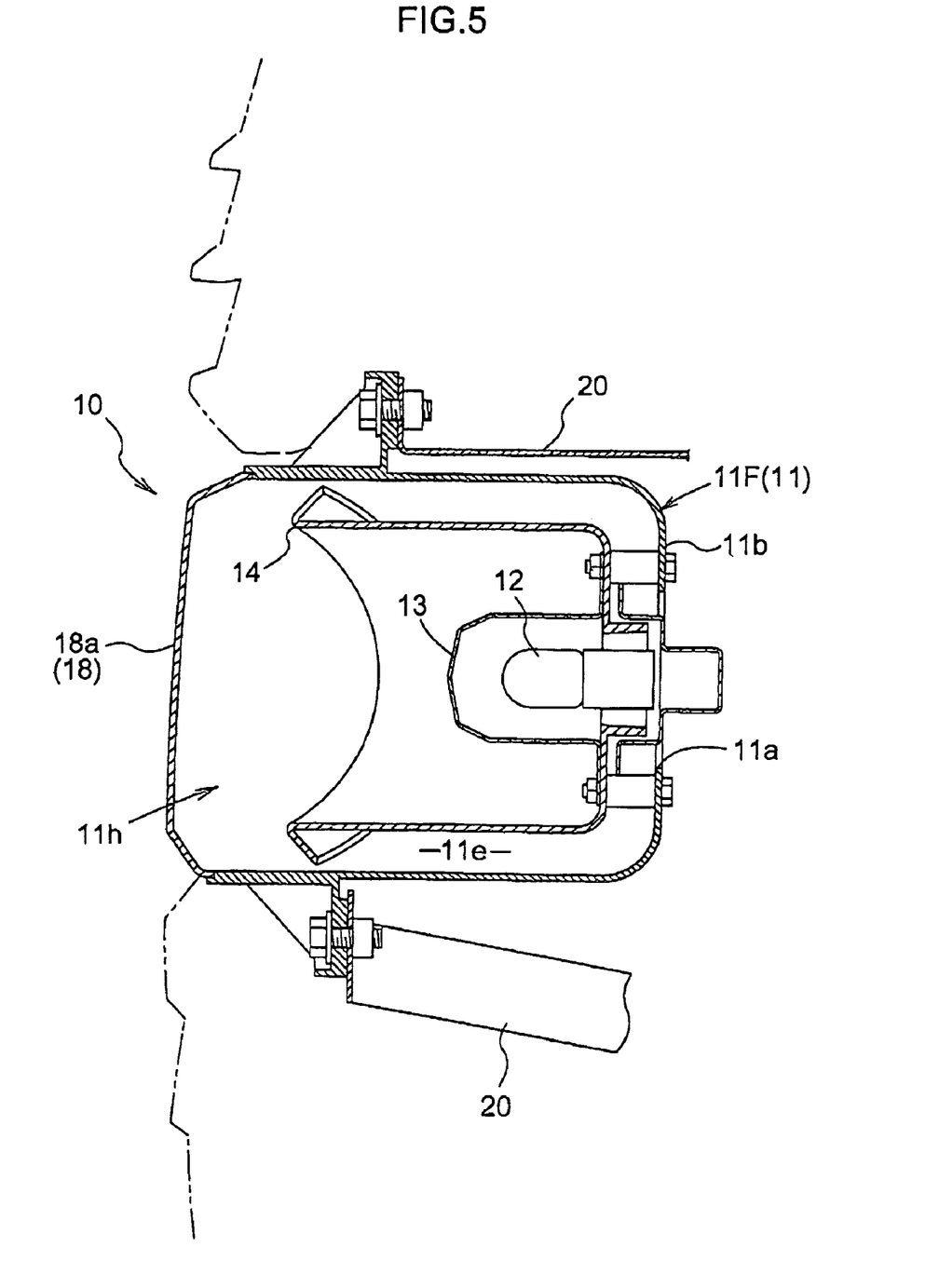
FIG. 5 is a side view in vertical section of the illuminating apparatus.

The translucent lens 18 includes a front lens portion 18a covering the right and left front lamps 12 and the ornamental plate 17, a left side lens portion 18b covering the left side lamp 15, and a right lens portion 18c covering the right side lamp 15, with these lens portions being formed together to construct a one-piece lens. As shown in FIGS. 4 and 5, the translucent lens 18 is directly connected and supported to the frame 11. This direct connection can be realized in the following manner for example. That is, the translucent lens 18 is placed in abutment against the open peripheral edge of the frame 11, so that this translucent lens 18 acts as a cover for an entire opening 11h of the accommodating recess lie of the frame 11. Then, under this condition, the peripheral edge of the translucent lens 18 is bonded by means of adhesive to the open peripheral edge of the frame 11.

With the above, by connecting the plurality of attaching portions 11g to the support member 20 provided forwardly of the vehicle body, the entire illuminating apparatus 10 can be attached to the front end of the vehicle body 100. And, as the beams from the right and left front lamps 12 are reflected forward by the front lamp reflectors 14, the area in front of the vehicle body is illuminated. Further, as the beam from the left side lamp is reflected to the left by the side lamp reflector 16, the left side area of the vehicle body is illuminated. Also, as the beam from the right side lamp is reflected to the right by the side lamp reflector 16, the right side area of the vehicle body is illuminated.

Figure 6:
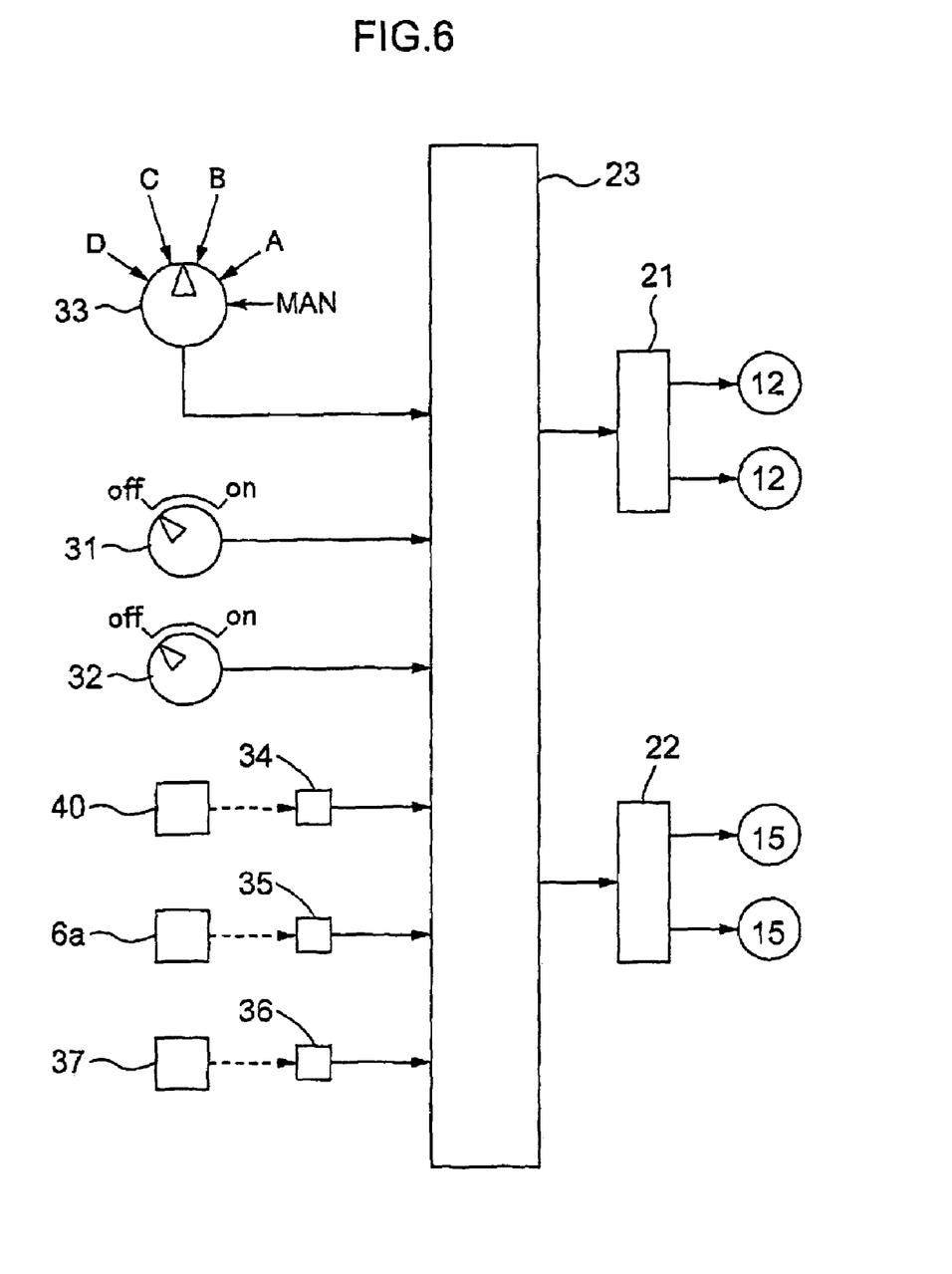
FIG. 6 is a block diagram of an illumination controlling construction.

As shown in FIG. 6, to the output side of a controller 23, there are operably connected an operational circuit 21 for the right and left front lamps 12 and an operational circuit 22 for the right and left side lamps 15. To the input side of this controller 23, there are operably connected a front lamp switch (an example of a switching device for the front illuminating unit) 31, a side lamp switch (an example of a switching device for the side illuminating unit) 32 and a mode selector switch 33, with these switches being provided inside the driver's cabin 4. To the input side of the controller 23, there are also operably connected a steering angle sensor 34, a lift angle sensor 35 and a vehicle speed sensor 36.

The front lamp switch 31 is switchable by an operator between two operational positions of light-on position ON and a light-off position OFF. When this front lamp switch 31 is switched over to the ON position, the controller 23 outputs an ON instruction for the front lamps 12. Conversely, when this front lamp switch 31 is switched over to the OFF position, the controller 23 outputs an OFF instruction for the front lamps 12.

The side lamp switch 32 is selectively operable to two positions of ON and OFF. With switchover this side lamp switch 32 to the ON position, an ON instruction for the side lamps 16 is outputted from the controller 23. On the other hand, with switchover of the side lamp switch 32 to the OFF position, an OFF instruction for the side lamps 15 is outputted from the controller 23, The steering angle sensor 34 comprises e.g. a potentiometer. And, an operational portion of this potentiometer is operably coupled to a pitman arm 40 of a steering device (not shown) operably connecting a steering wheel 25 to a knuckle arm of the right and left front wheels 1. In operation, this steering angle sensor 34 detects whether the right and left front wheels 1 have been laterally steered by an angle exceeding a preset minimum steering angle (e.g. 30 degrees), based on a pivoted angle of the pitman arm 40 relative to a reference position and detects also whether the steering direction of the front wheels 1 is to the left or to the right. And, these detection results are inputted to the controller 23.

The lift angle sensor 35 can also be a potentiometer. And, an operational portion of this potentiometer is operably coupled to the lift arm 6a. In operation, this lift angle sensor 35 detects that the rotary plow 30 connected to the vehicle body 100 has been lowered to a work position and detects also that the plow has been elevated to a non-work position And, these detection results are inputted to the controller 23.

The vehicle speed sensor 36 is attached to a transmission shaft 37 for transmitting the engine power to the right and left rear wheels 2. This sensor comprises a rotation sensor (torque sensor) for detecting the rotation rate per unit time, and detects the speed of the vehicle body 100 based on the detected rotation rate of the transmission shaft 37, And, this detection result is inputted to the controller 23.

The mode selector switch 33 is operable by the operation to any one of five operational positions of a manual mode position MAN, a steering mode position A, an illuminating mode position B, a lift mode position C and a vehicle speed mode position D.

When the mode selector switch 33 is operated to the manual mode position MAN, a manual mode instruction is inputted to the controller 23. When the switch 33 is operated to any one of the steering mode position A, the illuminating mode position B, the lift mode position C and the vehicle speed mode position D, an automatic control mode instruction corresponding to the operated position is inputted to the controller 23.

The controller 23 comprises a microcomputer, which is configured to operate the right and left front lamps 12 and the right and left side lamps 15 based on the instructions from the respective switches 31, 32, 33 and the detection results from the respective sensors 34, 35, 36 in the manner to be described next.

1. Illumination Control of Front Lamps 12

As for the right and left front lamps 12, the controller 23 operates based only on the information from the front lamp switch 31, regardless of whichever of the five operational positions the mode selector switch 33 may be operated to.

Specifically, when the front lamp switch 31 is operated to the ON position, based on this front lamp ON instruction from the front lamp switch 31, the controller 23 outputs to the front lamp operational circuit 21 a signal for turning ON the right and left front lamps 12. In this, the controller 23 causes, according to the instruction, both of the right and left front lamps 12 to be turned ON, regardless of the operational potions of the side lamp switch 32 and the mode selector switch 33 and the detection conditions of the respective sensors 34, 35, 36.

On the other hand, when the front lamp switch 31 is operated to the OFF position, based on this font lamp OFF instruction from the front lamp switch 31, the controller 23 outputs to the front lamp operational circuit 21 a signal for turning OFF the right and left front lamps 12. In this, the controller 23 causes, according to the instruction, both of the right and left front lamps 12 to be turned OFF, regardless of the operational potions of the side lamp switch 32 and the mode selector switch 33 and the detection conditions of the respective sensors 34, 35, 36.

2. Illumination Control of Side Lamps 15

[in the case of mode selector switch 33=manual mode position MAN]

In this mode, the controller 23 operates the right and left side lamps 15 based only on the information from the side lamp switch 32.

Specifically, when the controller 23 receives a side lamp OFF instruction from the side lamp switch 32, the controller 23 outputs to the side lamp operational circuit 22 a signal for turning OFF the right and left side lamps 15, so that the both of the right and left side lamps 15 are turned OFF, regardless of the operational condition of the front lamp switch 31 and the detection conditions of the respective sensors 34, 35, 36.

On the other hand, when the controller 23 receives a side lamp ON instruction from the side lamp switch 32, the controller 23 outputs to the side lamp operational circuit 22 a signal for turning ON the right and left side lamps 16, so that the both of the right and left side lamps 15 are turned ON, regardless of the operational condition of the front lamp switch 31 and the detection conditions of the respective sensors 34, 35, 36.

In this way, while this manual mode is selected, in response to the switchover of the side lamp switch 32 to the ON position, both of the right and left side lamps 15 alone are turned ON. In response to the switchover of the side lamp switch 32 to the OFF position, both of the right and left side lamps 15 alone are turned OFF.

[in the case of mode selector switch 33=steering mode position A]0

In this mode, the controller 23 operates the right and left side lamps 15, based on the information from the side lamp switch 32 and the steering angle sensor 34.

Specifically, when the side lamp switch 32 has been operated to the ON position thereby to input the side lamp ON instruction to the controller 23 and also the right and left front wheels 1 have been steered to the left by an angle exceeding a predetermined angle (e.g. 30 degrees) and this information is inputted as the detection result from the steering angle sensor 34 to the controller 23, the controller 23 outputs to the side lamp operational circuit 22 a signal for turning ON the left side lamp 15, thereby to turn ON this left side lamp 15 alone.

On the other hand, when the side lamp switch 32 has been operated to the ON position thereby to input the side lamp ON instruction to the controller 23 and also the right and left front wheels 1 have been steered to the right by an angle exceeding a predetermined angle (e.g. 30 degrees) and this information is inputted as the detection result from the steering angle sensor 34 to the controller 23, the controller 23 outputs to the side lamp operational circuit 22 a signal for turning ON the right side lamp 15, thereby to turn ON this right side lamp 15 alone.

In the above, however, even if the side lamp ON instruction is inputted to the controller 23 from the side lamp switch 32, if the right and left front wheels 1 are now traveling straight or the steering angle thereof to either side is below the predetermined angle (e.g. 30 degrees), then, the steering angle sensor 34 outputs this detection information to the controller 23. Hence, the controller 23 outputs to the side lamp operational circuit 22 a signal for turning OFF the right and left side lamps 15, thereby to turn OFF both of the right and left side lamps 15.

Conversely, even if the mode selector switch 33 outputs the steering mode instruction to the controller 23 and the side lamp switch 32 has been operated to the OFF position thereby to output a side lamp OFF instruction to the controller 23, the controller 23 turns OFF both of the right and left side lamps 15, regardless of the detection condition of the steering angle sensor 34.

As described above, when this steering mode is selected, with the preliminary setting of the side lamp switch 32 to the ON position, when the steering wheel 25 is turned to steer the right and left front wheels 1 to the right or the left by an angle exceeding the predetermined angle (e.g. 30 degrees), either side lamp 15 corresponding to that steered direction is automatically turned ON.

However, if the steering angle of the right and left front wheels 1 falls short of the predetermined angle, neither of the right and left side lamps 15 are turned ON. Also, when the side lamp switch 32 has been operated to the OFF position, even if the right and left front wheels 1 are steered by an angle exceeding the predetermined angle, neither of the right and left side lamps 15 are turned ON.

[in the case of mode selector switch 33=illuminating mode position B]

In this mode, the controller 23 operates the right and left side lamps 15, based on the information from the side lamp switch 32 and the front lamp switch 31.

Specifically, when the side lamp switch 32 is operated to the ON position to output the side lamp ON instruction to the controller 23 and also the front lamp switch 31 is operated to the ON position to output the front lamp ON instruction to the controller 23, the controller 23 outputs to the side lamp operational circuit 22 a signal for turning ON the right and left side lamps 16, thereby to turn ON both of the right and left side lamps 15.

On the other hand, when the side lamp switch 32 is operated to the ON position to output the side lamp ON instruction to the controller 23 and also the front lamp switch 31 is operated to the OFF position to output the front lamp OFF instruction to the controller 23, the controller 23 outputs to the side lamp operational circuit 22 a signal for turning OFF the right and left side lamps 15, thereby to turn OFF both of the right and left side lamps 15.

As described above, when this illuminating mode is selected, with preliminary setting of the side lamp switch 32 to the ON position, in response to switchover of the front lamp switch 31 to the ON position, all of the right and left front lamps 12 and the right and left side lamps 15 are turned ON. On the other hand, in response to switchover of the front lamp switch 31 to the OFF position, all of the right and left front lamps 12 and the right and left side lamps 15 are turned OFF.

However, even when this illuminating mode is selected, if the side lamp switch 32 has been operated to the OFF position, then, even when the front lamp switch 31 is switched over to the ON position, neither of the right and left side lamps 15 are turned ON.

[in the case of mode selector switch 33=lift mode position C]

In this mode, the controller 23 operates the right and left side lamps 16, based on the information from the side lamp switch 32 and the lift angle sensor 35.

Specifically, when the side lamp switch 32 is operated to the ON position to output the side lamp ON instruction to the controller 23 and also the rotary plow (an example of implement) 30 connected to the vehicle body 100 is operated to the lowered work position and the lift angle sensor 35 detects this and outputs this detection information to the controller 23, the controller 23 outputs a signal to the side lamp operational circuit 22 a signal for turning ON the right and left side lamps 15, thereby to turn ON both of the right and left side lamps 15.

On the other hand, when the side lamp switch 32 is operated to the ON position to output the side lamp ON instruction to the controller 23 and also the rotary plow 30 is operated to the elevated non-work position and the lift angle sensor 35 detects this and outputs this detection information to the controller 23, the controller 23 outputs a signal to the side lamp operational circuit 22 a signal for turning OFF the right and left side lamps 15, thereby to turn OFF both of the right and left side lamps 15.

However, in case the side lamp switch 32 has been operated to the OFF position to output the side lamp OFF instruction to the controller 23, the controller turns OFF the right and left side lamps 15, regardless of the detection information from the lift angle sensor 35.

As described above, when the lift mode position C is selected, with preliminary setting of the side lamp switch 32 to the ON position, when the lift arm 6a is pivotally lowered with operation of the lift cylinder 8 by an angle smaller than a predetermined angle (that is, when the rotary plow connected to the vehicle body 100 is lowered to the work condition), both of the right and left side lamps 15 are turned ON. On the other hand, when the lift arm 6*a* is pivotally elevated with operation of the lift cylinder 8 by an angle upwardly exceeding the predetermined angle (that is, when the rotary plow is elevated to the non-work condition), both of the right and left side lamps 15 are turned OFF.

However, if the side lamp switch 32 is at the OFF position, even when the implement is lowered to the work condition with operation of the lift cylinder 8, neither of the right and left side lamps 15 are turned ON.

Incidentally, the predetermined angle for the upward movement and the predetermined angle for the downward movement may be different from each other.

[in the case of mode selector switch 33=vehicle speed mode position D]

In this mode, the controller 23 operates the right and left side lamps 15, based on the information from the side lamp switch 32 and the vehicle speed sensor 36.

Specifically, when the side lamp switch 32 is operated to the ON position to output the side lamp ON instruction to the controller 23 and also the vehicle body 100 travels at a work traveling speed lower than a predetermined maximum speed and the vehicle speed sensor 36 detects this and outputs this detection information to the controller 23, the controller 23 outputs to the side lamp operational circuit 22 a signal for tuning ON the right and left side lamps 15, thereby to turn ON both of the right and left side lamps 15. The above-described predetermined maximum speed is set in advance as the maximum traveling speed realized during an implement word and stored in a memory of the controller 23.

On the other hand, when the side lamp switch 32 is operated to the ON position to output the side lamp ON instruction to the controller 23 and also the vehicle body 100 travels at a traveling speed higher than the predetermined maximum speed and the vehicle speed sensor 36 detects this and outputs this detection information to the controller 23, the controller 23 outputs to the side lamp operational circuit 22 a signal for turning OFF the right and left side lamps 15, thereby to turn OFF both of the right and left side lamps 15.

However, if the side lamp switch 32 has been operated to the OFF position to output the side lamp OFF instruction to the controller 23, the controller 23 turns OFF the right and left side lamps 15, regardless of the detection condition of the vehicle speed sensor 36.

As described above, when the vehicle speed mode position D is selected, with preliminary setting of the side lamp switch 32 to the ON position, when the front, and rear wheels 1, 2 are decelerated to render the traveling speed lower than the predetermined traveling speed, both of the right and left side lamps 16 are turned ON. On the other hand, when the front and rear wheels 1, 2 are accelerated to render the traveling speed higher than the predetermined speed, both of the right and left side lamps are turned OFF.

However, if the side lamp switch 32 has been operated to the OFF position, even if the front and rear wheels 1, 2 are decelerated to render the traveling speed lower than the predetermined traveling speed, neither of the right and left side lamps 15 are turned ON.

The five kinds of mode of the mode selector switch 33 have been described in details in the above. However, as described hereinbefore, regardless of the selection of these modes, the front lamps 12 are both turned ON when the front lamp switch 31 is at the ON position and are turned OFF when the switch 31 is at the OFF position.

[Other Embodiments]

The illuminating apparatus for a work vehicle relating to the invention is not limited to the foregoing embodiment. Various modifications thereof will be possible by those skilled in the art. Some of such other embodiments will be described next.

(1) In the foregoing embodiment, the front lamp switch 31 and the side lamp switch 32 are provided as the switching device for the front illuminating unit and the switching device for the side illuminating unit, respectively. Instead, controlling portions (e.g. touch panel or buttons) of a liquid crystal control panel may be employed as these switching devices.

(2) The control scheme for controlling ON/OFF of the side lamps 15, that is, the illumination control can be alternatively embodied as described next.

For instance, a light sensor (not shown) can be operably coupled with the controller 23, so that with preliminary setting of the side lamp switch 32 to the ON position, the right and left side lamps 15 may be automatically turned ON when the luminosity detected by this light sensor becomes lower than a predetermined lux value.

(3) A detecting means (not shown) for detecting engagement/disengagement of the engine power to and from the PTO shaft 7 can be operably coupled with the controller 23, so that with preliminary setting of the side lamp switch 32 to the ON position, the right and left side lamps 15 may be automatically turned ON when the power transmission to the PTO shaft 7 is engaged to drive the implement such as a rotary plow connected to the vehicle.

(4) Further, in case the implement comprises the rotary plow, there is sometimes provided a construction wherein lift control (control for automatically lifting up or down the lift arm 6*a* thereby to maintain the work depth of the rotary plow constant, regardless of inclination of the vehicle body in the fore and aft direction) is effected, based on detection result from a work depth detecting means (e.g. a depth sensor which can be a potentiometer not shown) for detecting a work depth of the rotary plow. In this construction, the illuminating apparatus of the present invention may be implemented. In that case, it is possible to cause the right and left side lamps to be automatically turned ON in response to an ON operation of an ON/OFF switch (not shown) for the lift control, when the side lamp switch 32 is located at the ON position.

(5) Further, with the work vehicle, there is sometimes effected a rolling control for maintaining right and left work depths of the implement constant regardless of inclination of the vehicle body in the right and left direction, by lifting one of the right and left lift arms 6*a*, based on detection result of inclination detecting means (not show) for detecting right and left inclination of the vehicle body. Then, in case the illuminating apparatus according to the present invention is to be used in the work vehicle having this control function, it is possible to arrange such that the right and left side lamps 15 are automatically turned ON in response to an ON operation of an ON/OFF switch (not shown) for the rolling control, when the side lamp switch 32 is located at the ON position.

(6) Some work vehicles have a small-turn control function wherein when the steering wheel 25 is turned to steer the right and left front wheels 1 by an angle exceeding a predetermined angle, one of the rear wheels on the inner side of the turning circle is braked and/or a front-wheel accelerator (not show) is engaged for rendering the drive speed of the right and left front wheels greater than the drive speed of the rear wheels. Then, in case the illuminating apparatus according to the present invention is used in a work vehicle having such control function, it is possible to arrange such that the right and left side lamps 15 are automatically turned ON in response to execution of the small-turn control, with the preliminary setting of the side lamp switch 32 to the ON position.

(7) Further, it is also possible to make an arrangement such that with preliminary setting of the side lamp switch 32 to the ON position, the right and left side lamps 15 are automatically turned ON, in association with realization of at least two of the conditions of: ON operation of the front lamp switch 31, the steering operation of the right and left front wheels 1 by an angle exceeding a predetermined steering angle, the lowering operation of the implement to the lowered work position, the deceleration to a speed lower than the set speed, the detection of the predetermined lux value, the engagement of the power transmission to the implement, the execution of the small-turn control, the engagement of the implement lift control, and the engagement of the rolling control.

(8) Instead of the tractor described above, the present invention may be applied to other various kinds of work vehicles for carrying out lawn mowing, ice planting works, etc.

The invention may be embodied in any other way than disclosed in the above detailed description without departing from the essential spirit thereof defined in the appended claims. All modifications apparent for those skilled in the art are intended to be encompassed within the scope of the invention defined by the claims.

The invention claimed is:

1. An illuminating apparatus for a work vehicle comprising:
   a front illuminating unit;
   a side illuminating unit;
   a frame supporting the front illuminating unit and the side illuminating unit; and
   a translucent lens unit covering the front illuminating unit and the side illuminating unit;
   wherein the translucent lens unit comprises a one-piece translucent lens directly connected to and supported by the frame and wherein the front illuminating unit has a reflector attached to the frame and not integral with the frame; and
   the frame includes an attaching portion for attaching the frame to a front portion of the vehicle body.

2. The illuminating apparatus according to claim 1, wherein the front illuminating unit, the side illuminating unit, the frame and the translucent lens are assembled as a single unit.

3. The illuminating apparatus according to claim 2, wherein the frame includes a front frame portion for supporting right and left front lamps of the front illuminating unit and side frame portions extending rearwardly and integrally from opposed ends of the front frame portion for supporting side lamps of the side illuminating unit such that the side frame portions define a space therebetween in plan view.

4. The illuminating apparatus according to claim 1, wherein said front illuminating unit comprises a pair of right and left front lamps and said side illuminating unit comprises a pair of right and left side lamps.

5. The illuminating apparatus according to claim 4, wherein the frame includes a front frame portion for supporting the right and left front lamps and side frame portions extending from opposed ends of the front frame portion to the rear side of the vehicle body for supporting the side lamps.

6. The illuminating apparatus according to claim 4, wherein said translucent lens includes a front lens portion covering the right and left front lamps and side lens portions covering the right and left side lamps.

7. The illuminating apparatus according to claim 4, wherein the frame defines a recess for accommodating the front lamps and the side lamps therein and an opening of this recess is closed by the translucent lens.

8. The illuminating apparatus according to claim 4, wherein the side lamp on the inner side of steering is automatically turned ON in response to an ON instruction from a switching device for each side lamp and also to the steering of steering wheels by an angle exceeding a predetermined angle.

9. The illuminating apparatus according to claim 4, wherein the side lamp is automatically turned ON in response to an ON instruction from a switching device for each front lamp and also to an ON instruction from a switching device for each side lamp.

10. The illuminating apparatus according to claim 4, wherein said each side lamp is automatically turned ON, in response to an ON instruction from a switching device for the side lamp unit and also to a lowering movement of an implement connected to the rear of the vehicle body to a lowered work position.

11. The illuminating apparatus according to claim 4, wherein said each side lamp is automatically turned ON, in response to an ON instruction from a switching device for the side lamp unit and also to a change in the traveling speed of the vehicle to speed lower than a predetermined speed.

12. The illuminating apparatus according to claim 4, wherein a pair of right and left pair of the side lamps are attached and supported laterally of the vehicle body.

13. The illuminating apparatus according to claim 12, wherein a side lamp reflector for reflecting beam from said each side lamp is formed symmetric in the right and left direction across the side lamp in a plan view.

14. The illuminating apparatus according to claim 12, wherein a side lamp reflector is formed vertically asymmetric across the side lamp in a side view with an upper portion of the reflector above the side lamp being wider than a lower portion thereof below the side lamp.

15. An illuminating apparatus for a work vehicle, comprising:
    a front illuminating unit;
    a side illuminating unit;
    a frame supporting the front illuminating unit and the side illuminating unit; and
    a light-transmitting unit covering the front illuminating unit and the side illuminating unit;
    wherein the light-transmitting unit comprises a one-piece light-transmitting member directly connected to and supported by the frame and wherein the front illuminating unit has a reflector attached to the frame and not integral with the frame; and
    the frame includes an attaching portion for attaching the frame to a front portion of the vehicle body.

16. The illuminating apparatus according to claim 15, wherein said front illuminating unit comprises a pair of right and left front lamps and said side illuminating unit comprises a pair of right and left side lamps.

17. The illuminating apparatus according to claim 16, wherein the front illuminating unit, the side illuminating unit, the frame and the light-transmitting unit are assembled as a single unit.

18. The illuminating apparatus according to claim 17, wherein the frame includes a front frame portion for supporting the right and left front lamps and side frame portions extending rearwardly and integrally from opposed ends of the front frame portion for supporting the side lamps such that the side frame portions define a space therebetween in plan view.

19. The illuminating apparatus according to claim 18, wherein the light-transmitting unit is attached to the frame by means of adhesive.

* * * * *